United States Patent
Kunert et al.

(10) Patent No.: US 6,989,633 B2
(45) Date of Patent: Jan. 24, 2006

(54) ALKALINE-EARTH ALUMINOSILICATE GLASS, CONTAINING CA AND BA, SUITABLE FOR USE IN LAMP BULBS, AND A LAMP BULB CONTAINING SAME

(75) Inventors: Christian Kunert, Mainz (DE); Karin Naumann, Ober-Olm (DE); Franz Ott, Mitterteich (DE); Ottmar Becker, Langen (DE)

(73) Assignee: Schott AG, Mainz (DE)

( * ) Notice: Subject to any disclaimer, the term of this patent is extended or adjusted under 35 U.S.C. 154(b) by 159 days.

(21) Appl. No.: 10/356,746

(22) Filed: Feb. 3, 2003

(65) Prior Publication Data

US 2003/0181309 A1 Sep. 25, 2003

(30) Foreign Application Priority Data

Feb. 1, 2002 (DE) ......................... 102 04 149

(51) Int. Cl.
*H01J 17/16* (2006.01)
*H01J 61/30* (2006.01)
*C03C 3/076* (2006.01)
*C03C 3/11* (2006.01)
*C03C 3/112* (2006.01)

(52) U.S. Cl. .................... 313/634; 313/646; 501/55; 501/56; 501/57; 501/58; 501/59; 501/60; 501/61; 501/62; 501/63; 501/64; 501/65; 501/66; 501/67; 501/68

(58) Field of Classification Search ............... 313/634, 313/636; 501/55–72
See application file for complete search history.

(56) References Cited

U.S. PATENT DOCUMENTS

| 521,524 A | 6/1894 | Duncan |
| 4,521,524 A | * 6/1985 | Yamashita ............ 501/64 |
| 6,069,100 A | 5/2000 | Naumann et al. |
| 6,074,969 A | 6/2000 | Naumann et al. |
| 6,373,193 B1 | 4/2002 | Marlor et al. |
| 6,500,778 B1 | * 12/2002 | Maeda et al. ............ 501/66 |
| 6,552,489 B2 | * 4/2003 | Sakakibara ............ 313/636 |
| 2004/0070327 A1 | 4/2004 | Bergmann et al. |

FOREIGN PATENT DOCUMENTS

| DE | 197 47 354 C1 | 12/1998 |
| DE | 197 47 355 C1 | 6/1999 |
| DE | 197 58 481 C1 | 6/1999 |
| DE | 100 22 769 A1 | 11/2001 |
| EP | 1 065 177 | 1/2001 |
| WO | WO 99/14794 | 3/1999 |

OTHER PUBLICATIONS

Paper filed by Opposer Telux Lampenrohr GmbH dated Feb. 25, 2005.
Opposition by Telux Lampenrohr GmbH against Schott Glas' German Patent No. 10204149.0–45 (Sep. 10, 2003).
Response to Opposition by Schott Glas (Mar. 31, 2004).
Excerpt from Werner Vogel's Glaschemistry, p. 261 (1992).
Glas Natur, Struktur und Eigenschaften, p. 1 of 3.Eigenschaften des Glases, p. 188, 1977.
Technik der Glasherstellung, pp. 32–33.
Werner Vogel Glas–chemie, pp. 217, 223, 225.
Lichtprogram '98/99 Es Gibt Licht. Und Es Gibt Osram., DIN 5033.
F. Kohlrausch, "Praktische Physik", Zum Gebrauch Für Unterricht, Forschung Und Technik, pp. 270 4.1

* cited by examiner

*Primary Examiner*—Joseph Williams
*Assistant Examiner*—Matt Hodges
(74) *Attorney, Agent, or Firm*—Millen, White, Zelano, Branigan, P.C.

(57) ABSTRACT

An alkaline-earth aluminosilicate glass having a composition (in % by weight, based on oxide) of $SiO_2$>55–64; $Al_2O_3$ 13–18; $B_2O_3$ 0–5.5; $M_5O$ 0–7; CaO 5.5–14; SrO 0–8; BaO 6–17; $ZrO_2$ 0–2; $CeO_2$ 0–0.3; $TiO_2$ 0–0.5; CoO 0.01–0.035; $Fe_2O_3$ 0.005–0.05; and NiO 0–0.03 is suitable for use in lamp bulbs

20 Claims, 1 Drawing Sheet

Example A2 (d = 1.42 mm)

ALKALINE-EARTH ALUMINOSILICATE GLASS, CONTAINING CA AND BA, SUITABLE FOR USE IN LAMP BULBS, AND A LAMP BULB CONTAINING SAME

SUMMARY OF THE INVENTION

The invention relates to an alkaline-earth alumino-silicate glass for lamp bulbs. The invention also relates to the use of the glass. The invention also relates to the lamp bulb and the halogen lamp having a bulb made from this glass.

Colorless glasses with a high transformation temperature Tg and a high strain point SP are used as bulb material for halogen lamps, for example, for the illumination and automotive sector.

According to Planck's radiation law, the color sensation of the light emitted by these halogen lamps is dependent on the temperature of the incandescent filament, since in the visible spectral region there is scarcely any additional filtering.

If the temperature of the incandescent filament is increased, the color sensation of the light shifts into the blue. This "color sensation" can be determined in accordance with DIN 5033 and is expressed by the three trichromatic coefficients x, y and Y, which designate what is known as the color locus.

Alternatively, it is possible to give the "color temperature" of the light. This is defined as the temperature at which a Planckian black body radiator has a spectral shift which is as similar as possible to the light which is to be characterized. An increase in the color temperature corresponds to a shift in the color sensation toward "blue".

It is desirable for the color temperature of the light perceived to be as high as possible. This makes the lamp appear particularly bright and striking, as is required, for example, for automobile headlamps. A halogen lamp with an output of 65 W comprising a standard colorless hard-glass bulb with a diameter of 16 mm and a wall thickness of 1.4 mm has a color temperature of, for example, approx. 3 100 K, measured using the Ulbricht sphere.

An increase in the incandescent filament temperature and therefore also in the color temperature is limited not only by the bulb material and its ability to withstand thermal loads but, in particular, also by the filament material and its service life.

It is desirable for the color sensation of the light emitted by halogen lamps to approximately correspond to the luminous color of high-pressure or gas-discharge lamps. Halogen lamps in which the luminous color of high-pressure and gas-discharge lamps is imitated in various ways are already commercially available.

The color sensation of the lamp is altered, for example, by providing standard halogen lamp bulbs with a colored coating. In this case, however, a further process step, which entails additional costs, has to be carried out after the lamp bulbs have been produced, and this step cannot usually be carried out by the lamp manufacturer. After prolonged use, the coatings may present aging phenomena as a result of layers flaking off, and the coatings have a relatively considerable fluctuation in the light transmission and therefore in the color sensation of the light. It is difficult to establish a defined layer thickness over the entire surface of the lamp.

As an alternative to an additionally applied layer, glass tubes which are colored all the way through, made from a very $SiO_2$-rich, expensive glass known as VYCOR glass, are used. This glass has drawbacks in processing and in melting, i.e., it can only be processed, for example, at significantly higher temperatures than the conventional hard glasses which are used for halogen lamps. For example, the working point $V_A$ of commercial hard glass is between 1 250 and 1 300° C., while for VYCOR glass it is >1 600° C. Moreover, the thermal expansion of hard and VYCOR glasses differs. These and other differences mean that VYCOR glasses cannot readily be processed in standard halogen lamp production facilities.

It is therefore an object of the invention to provide a glass for bulbs for halogen lamps having a high color temperature, in particular a color temperature of at least 3 400 K. Another object is to produce the lamp bulbs without additional process steps on facilities which are standard for halogen lamp production. Moreover, the glass is to satisfy the standard requirements imposed on halogen lamp glasses, namely a thermal expansion which is matched to the thermal expansion characteristics of molybdenum, a sufficient thermal stability and an absence of alkali metals.

Upon further study of the specification and appended claims, further objects and advantages of this invention will become apparent to those skilled in the art.

These objects are achieved by an alkaline-earth aluminosilicate glass containing CoO and $Fe_2O_3$, and optionally NiO.

The glass which is suitable as a lamp bulb glass preferably comprises a base glass system (in % by weight, based on oxide) containing $SiO_2$ >55–64, preferably >58–62; $Al_2O_3$ 13–18, preferably 13.5–17.5, $B_2O_3$ 0–5.5; MgO 0–7; CaO 5–14, preferably 5.5–14, SrO 0–8; BaO 6–17, preferably 6–10; $ZrO_2$ 0–2; $CeO_2$ 0–0.3; $TiO_2$ 0–0.5. Base glasses of this type are described, for example, in DE 197 47 354 C1, DE 197 47 355 C1 and DE 197 58 481 C1, the entire disclosures of which are incorporated by reference.

For example, base glasses comprising (in % by weight, based on oxide) $SiO_2$ 59–62; $Al_2O_3$ 13.5–15.5; $B_2O_3$ 3–5.5; MgO 2.3–5; CaO 8.2–10.5, BaO 8.5–9.5; $ZrO_2$ 0–1; $CeO_2$ 0–0.3; $TiO_2$ 0–0.5 are particularly suitable for lamp bulbs having bulb temperatures of at most 650° C., while base glasses comprising (in % by weight, based on oxide) $SiO_2$ >58–62; $Al_2O_3$ 14–17.5, preferably 15–17.5; $B_2O_3$ 0–1, preferably 0–0.7; MgO 0–7; CaO 5.5–14; SrO 0–8; BaO 6–17, preferably 6–10; $ZrO_2$ 0–2; $CeO_2$ 0–0.3; $TiO_2$ 0–0.5 are particularly suitable for lamp bulbs with bulb temperatures of more than 650° C.

CoO and the $Fe_2O_3$ are added to the base glass to alter the emitted light spectrum of the glass. For example, these colored oxides, in amounts of 0.01–0.035% by weight of CoO and 0.005–0.05% by weight of $Fe_2O_3$ alter the spectrum of the light emitted by the lamp in such a way that it is similar to the spectrum of a Planckian black body radiator at relatively high temperatures, especially in such a way that the lamp has a color temperature of $\geq$3 400 K.

Even in the concentrations mentioned, which have scarcely any effect on the other properties of the glass, the CoO has particularly strong absorptance in the spectral region between 580 and 680 nm. It is preferable for the glasses to contain between 0.02 and 0.03% by weight of CoO.

$Fe_2O_3$ absorbs at approx. 450 nm and in the infrared at approx. 1 000–1 100 nm, with considerable effects on the transmission even in the relatively long-waved visible region. The maximum $Fe_2O_3$ content is preferably $\leq$0.05% by weight, since if the concentrations are higher the other properties of the glass change. It is very preferable for the glasses to contain between 0.015 and 0.03% by weight of $Fe_2O_3$.

Furthermore, the glasses may contain up to about 0.03% by weight of NiO. NiO absorbs between 450 and 630 nm, with the strongest band lying at 450 nm and, therefore, more in the short-wave region.

The combined use of the abovementioned two and in particular the abovementioned three colored oxides allows the color locus and the transmission of the glass to be set in a targeted and accurate manner within wide limits.

The glasses may also contain up to 5% by weight of $Nd_2O_3$. The strongest absorption bands of $Nd_2O_3$ lie at 580 nm and 750 nm. However, it is preferable to dispense with this oxide, since it makes the glasses considerably more expensive, not just on account of the abovementioned relatively high contents which are needed to achieve a significant effect on account of its low extinction coefficient.

The glasses may contain standard refining agents in customary amounts. They are preferably free of $As_2O_3$ and $Sb_2O_3$.

In the foregoing and in the following examples, all temperatures are set forth uncorrected in degrees Celsius, unless otherwise indicated; and, unless otherwise indicated, all parts and percentages are by weight.

The entire disclosure of all applications, patents and publications, cited above and below, and of corresponding German Application No. 102 04 149.0-45, filed Feb. 1, 2002, is hereby incorporated by reference.

EXAMPLES

Figure 1:
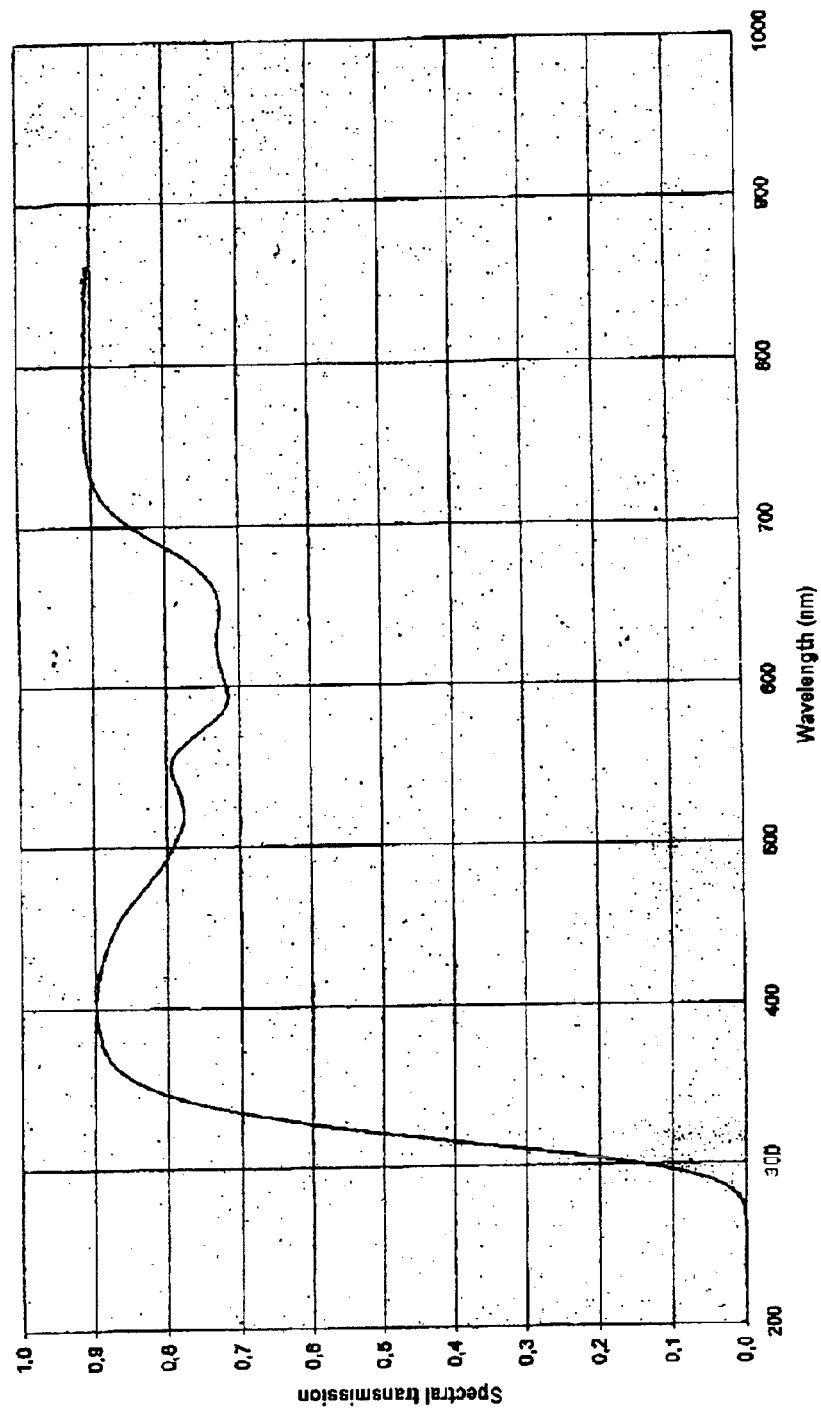
FIG. 1 illustrates the spectral transmission for wavelengths between 200 and 900 nm for the glass of embodiment A2.

Table 1 gives the colored oxide contents and the measured color loci, the color temperatures determined therefrom and the transmission for three exemplary embodiments and one comparative example.

The basic composition of the three exemplary embodiments and of the comparative example is (in % by weight, based on oxide) $SiO_2$ 60.7; $Al_2O_3$ 16.5; $B_2O_3$ 0.3; CaO 13.5; BaO 7.8; $ZrO_2$ 1.0.

The color locus in accordance with DIN 5033 is in this case given by x and y (the value Y, which describes the brightness of a color, is not taken into consideration here) and has been measured with a specimen thickness of 1.4 mm, a 2 degree viewing field and light according to Planck 3 110 K. The color temperature [K] equivalent to the color loci is likewise given.

The transmission $\tau$ [%] was likewise measured with a specimen thickness of 1.4 mm, a 2 degree viewing field and light according to Planck 3 110 K.

The glasses were produced in the following way: the raw materials were weighed out and thoroughly mixed. In the process, the colored oxides were introduced as a mixture, preferably with $SiO_2$, so that it was possible to minimize errors when weighing in the small quantity required and the colored oxides were distributed uniformly throughout the entire batch, which is important for homogeneity of the glasses. The glass batch was melted at approx. 1 600° C. and then drawn into a tube shape with suitable dimensions.

TABLE 1

Exemplary embodiments (A1–A3) and comparative example (C)
Colored oxide contents and significant properties

|  | A1 | A2 | A3 | C |
| --- | --- | --- | --- | --- |
| CoO [% by weight] | 0.027 | 0.025 | 0.03 | — |
| NiO [% by weight] | — | — | 0.005 | — |
| $Fe_2O_3$ [% by weight] | 0.005 | 0.02 | 0.005 | 0.027 |
| Color locus |  |  |  |  |
| x | 0.417 | 0.416 | 0.416 | 0.429 |
| y | 0.396 | 0.396 | 0.395 | 0.401 |
| $\tau_{1.4\,mm}$ [%] | 76.4 | 75.7 | 74.5 | 90.7 |
| Color temp. [K] | approx. 3 450 | approx. 3 450 | approx. 3 450 | approx. 3 100 |

The comparison between C and A1 to A3 demonstrates the influence of the colored oxide combination which is essential to the invention. This influence is also made clear by a comparison with the color locus and color temperature of a standard high-pressure lamp: the values x=0.410 and y=0.393 and 3 450 K of this standard lamp demonstrate that the objective of coming closer to the color sensation of a high-pressure lamp using the glass according to the invention for halogen lamp bulbs was achieved.

Different types of halogen lamps differ in terms of the diameter and wall thickness of the lamp bulb. The wall thickness has a significant effect on the color temperature of the lamp. With an identical glass composition, a greater wall thickness results in a lower color temperature.

The previous details regarding color temperature related to halogen lamps with a lamp bulb wall thickness of approx. 1.4 mm. In the case of halogen lamps with a lamp bulb wall thickness of approx. 1.1 mm made from a glass in accordance with exemplary embodiment A2, it is possible to increase the color temperature compared to a lamp having the same wall thickness made from a glass in accordance with the comparative example by 250 K, specifically from 3 400 K to 3 650 K.

FIG. 1 plots the spectral transmission against wavelength between 200 and 900 nm for the glass in accordance with exemplary embodiment A2 with a specimen thickness of 1.42 mm.

The high transmission in the short-wave visible region and the transmission, which is reduced by comparison, in the long-wave region of the visible spectrum are evidence of the color sensation which has been shifted into the blue.

On account of the colored oxide concentrations, which according to the invention are only low, the physical properties which are essential for use of the glass for lamp bulbs, in particular for halogen lamps, such as the coefficient of thermal expansion $\alpha_{20/300}$ and the transformation temperature $T_g$, remain virtually unchanged compared to the basic composition.

For example, in the glasses according to the invention, $\alpha_{20/300}$ is between $4.3 \times 10^{-6}$/K and $4.95 \times 10^{-6}$/K, and $T_g$ is >700° C.

Therefore, and in view of the abovementioned spectral properties, the glasses with their special doping of at least the two colored oxides CoO, $Fe_2O_3$, and preferably the three colored oxides CoO, $Fe_2O_3$ and NiO, are eminently suitable for use as bulb material for lamp bulbs, especially for halogen lamp bulbs.

Lamp bulbs made from the glass according to the invention and halogen lamps having bulbs made from this glass provide an exceptionally good imitation, in terms of their color loci and their color temperature of ≧3 400 K, of the color sensation of high-pressure and gas-discharge lamps and are therefore far superior to conventional halogen lamps in terms of their color sensation. If the lamp bulb geometry, in particular the lamp bulb wall thickness, is selected appropriately, the halogen lamps according to the invention with color temperatures of ≧3 600 K achieve an even more blue/lighter color sensation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An alkaline-earth aluminosilicate glass for lamp bulbs, having a composition (in % by weight, based on oxide) comprising:

| | |
|---|---|
| $SiO_2$ | >55–64 |
| $Al_2O_3$ | 13–18 |
| $B_2O_3$ | 0–5.5 |
| MgO | 0–7 |
| CaO | 5–14 |
| SrO | 0–8 |
| BaO | 6–17 |
| $ZrO_2$ | 0–2 |
| $CeO_2$ | 0–0.3 |
| $TiO_2$ | 0–0.5 |
| CoO | 0.01–0.035 |
| $Fe_2O_3$ | 0.005–0.05. |

2. An alkaline-earth aluminosilicate glass as claimed in claim 1, comprising (in % by weight, based on oxide):

| | |
|---|---|
| $SiO_2$ | >58–62 |
| $Al_2O_3$ | 13.5–17.5 |
| $B_2O_3$ | 0–5.5 |
| MgO | 0–7 |
| CaO | 5.5–14 |
| SrO | 0–8 |
| BaO | 6–10 |
| $ZrO_2$ | 0–2 |
| $CeO_2$ | 0–0.3 |
| $TiO_2$ | 0–0.5 |
| CoO | 0.01–0.035 |
| $Fe_2O_3$ | 0.005–0.05. |

3. An alkaline-earth aluminosilicate glass as claimed in claim 1, comprising (in % by weight, based on oxide):

| | |
|---|---|
| $SiO_2$ | 59–62 |
| $Al_2O_3$ | 13.5–15.5 |
| $B_2O_3$ | 3–5.5 |
| MgO | 2.5–5 |
| CaO | 8.2–10.5 |
| BaO | 8.5–9.5 |
| $ZrO_2$ | 0–1 |
| $TiO_2$ | 0–0.5 |
| CoO | 0.01–0.035 |
| $Fe_2O_3$ | 0.005–0.05. |

4. An alkaline-earth aluminosilicate glass as claimed in claim 1, comprising (in % by weight, based on oxide):

| | |
|---|---|
| $SiO_2$ | >58–62 |
| $Al_2O_3$ | 14–17.5 |
| $B_2O_3$ | 0–1 |
| MgO | 0–7 |
| CaO | 5.5–14 |
| SrO | 0–8 |
| BaO | 6–17 |
| $ZrO_2$ | 0–2 |
| $CeO_2$ | 0–0.3 |
| $TiO_2$ | 0–0.5 |
| CoO | 0.01–0.035 |
| $Fe_2O_3$ | 0.005–0.05. |

5. An alkaline-earth aluminosilicate glass as claimed in claim 1, comprising (in % by weight, based on oxide):

| | |
|---|---|
| $SiO_2$ | >58–62 |
| $Al_2O_3$ | 15–17.5 |
| $B_2O_3$ | 0–0.7 |
| MgO | 0–7 |
| CaO | 5.5–14 |
| SrO | 0–8 |
| BaO | 6–10 |
| $ZrO_2$ | 0–2 |
| $CeO_2$ | 0–0.3 |
| $TiO_2$ | 0–0.5 |
| CoO | 0.01–0.035 |
| $Fe_2O_3$ | 0.005–0.05. |

6. An alkaline-earth aluminosilicate glass as claimed in claim 1, further comprising up to 0.03% by weight of NiO.

7. An alkaline-earth aluminosilicate glass as claimed in claim 2, further comprising up to 0.03% by weight of NiO.

8. An alkaline-earth aluminosilicate glass as claimed in claim 3, further comprising up to 0.03% by weight of NiO.

9. An alkaline-earth aluminosilicate glass as claimed in claim 4, further comprising up to 0.03% by weight of NiO.

10. An alkaline-earth aluminosilicate glass as claimed in claim 5, further comprising up to 0.03% by weight of NiO.

11. An alkaline-earth aluminosilicate glass as claimed in claim 1, containing 0.02–0.03% by weight of CoO.

12. An alkaline-earth aluminosilicate glass as claimed in claim 1, containing 0.015–0.03% by weight of $Fe_2O_3$.

13. An alkaline-earth aluminosilicate glass as claimed in claim 11, containing 0.015–0.03% by weight of $Fe_2O_3$.

14. An alkaline-earth aluminosilicate glass as claimed in claim 1, wherein said glass has a coefficient of thermal expansion $\alpha_{20/300}$ of $4.3\times10^{-6}$/K–$4.95\times10^{-6}$/K, a transformation temperature $T_g$ of more than 700° C.

15. In a lamp bulb made from a glass, the improvement wherein said glass is as claimed in claim 1.

16. In a lamp bulb made from a glass, the improvement wherein said glass is as claimed in claim 14.

17. A lamp bulb according to claim 15, wherein said lamp is a halogen lamp.

18. A lamp bulb according to claim 16, wherein said lamp is a halogen lamp.

19. A halogen lamp having a lamp bulb made from a glass as claimed in claim 1, having a color temperature of ≧3 400 K.

20. A halogen lamp according to claim 19, wherein said glass has a color temperature of ≧3 600 K.

* * * * *